(12) United States Patent
Peng et al.

(10) Patent No.: US 12,112,506 B2
(45) Date of Patent: Oct. 8, 2024

(54) SYSTEM FOR CALIBRATING EXTRINSIC PARAMETERS FOR A CAMERA IN AN AUTONOMOUS VEHICLE

(71) Applicant: GM Global Technology Operations LLC, Detroit, MI (US)

(72) Inventors: Farui Peng, Sterling Heights, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 379 days.

(21) Appl. No.: 17/688,157

(22) Filed: Mar. 7, 2022

(65) Prior Publication Data

US 2023/0281872 A1 Sep. 7, 2023

(51) Int. Cl.
*G06T 7/80* (2017.01)
*G06T 7/246* (2017.01)
*G06T 7/292* (2017.01)
*G06T 7/73* (2017.01)

(52) U.S. Cl.
CPC ............... *G06T 7/80* (2017.01); *G06T 7/246* (2017.01); *G06T 7/292* (2017.01); *G06T 7/73* (2017.01); *G06T 2207/30248* (2013.01)

(58) Field of Classification Search
None
See application file for complete search history.

(56) References Cited

U.S. PATENT DOCUMENTS

| | | | | |
|---|---|---|---|---|
| 9,201,424 B1* | 12/2015 | Ogale | ................. | G05D 1/0253 |
| 11,428,541 B1* | 8/2022 | Khalili | ................. | G01C 25/005 |
| 11,702,089 B2* | 7/2023 | Griffith | ................. | G06T 7/277 |
| | | | | 701/23 |
| 2022/0227380 A1* | 7/2022 | Griffith | ................. | G06T 7/246 |
| 2023/0126333 A1* | 4/2023 | Ali | ................. | B60W 50/00 |
| | | | | 701/25 |
| 2023/0367003 A1* | 11/2023 | Berthold | ................. | G01S 13/72 |

OTHER PUBLICATIONS

Li, You, Yassine Ruichek, and Cindy Cappelle. "3D triangulation based extrinsic calibration between a stereo vision system and a LIDAR." 2011 14th International IEEE Conference on Intelligent Transportation Systems (ITSC). IEEE, 2011. (Year: 2011).*

(Continued)

*Primary Examiner* — Andrae S Allison
(74) *Attorney, Agent, or Firm* — Vivacqua Crane, PLLC

(57) ABSTRACT

A system for determining calibrated camera extrinsic parameters for an autonomous vehicle includes a camera mounted to the autonomous vehicle collecting image data including a plurality of image frames. The system also includes one or more automated driving controllers in electronic communication with the camera that executes instructions to determine a vehicle pose estimate based on position and movement of the autonomous vehicle by a localization algorithm. The one or more automated driving controllers determine the calibrated camera extrinsic parameters based on three dimensional coordinates for specific feature points of interests corresponding to two sequential image frames, the specific feature points of interests corresponding to the two sequential image frames, and the camera pose corresponding to the two sequential image frames.

20 Claims, 3 Drawing Sheets

(56) References Cited

OTHER PUBLICATIONS

Bersani, Mattia, et al. "Robust vehicle pose estimation from vision and INS fusion." 2020 IEEE 23rd International Conference on Intelligent Transportation Systems (ITSC). IEEE, 2020. (Year: 2020).*

Musleh B, Martin D, Armingol JM, de la Escalera A. Pose Self-Calibration of Stereo Vision Systems for Autonomous Vehicle Applications. Sensors (Basel). Sep. 14, 2016;16(9):1492. doi: 10.3390/s16091492. PMID: 27649178; PMCID: PMC5038765. (Year: 2016).*

Qin et al., "VINS-Mono: A Robust and Versatile Monocular Visual-Inertial State Estimator." IEEE Transactions on Robotics, Aug. 2018, vol. 34, Issue 4.

U.S. Appl. No. 17/329,613, filed May 25, 2021.

* cited by examiner

SYSTEM FOR CALIBRATING EXTRINSIC PARAMETERS FOR A CAMERA IN AN AUTONOMOUS VEHICLE

INTRODUCTION

The present disclosure relates to a system for calibrating camera extrinsic parameters for a specific camera in an autonomous vehicle based on a vehicle pose estimate determined by a localization algorithm, initial extrinsic parameters of the specific camera, and by tracking feature points between two sequential image frames collected by the specific camera.

Autonomous vehicles may employ a variety of sensory technologies that collect data related to their surroundings such as, but not limited to, radar, laser light, global positioning systems (GPS), and cameras. For example, cameras are mounted along the front, rear, and both sides of the autonomous vehicle for viewing the surrounding environment. A camera generates readings expressed in a respective camera coordinate system, where the readings provided by the camera are converted into readings expressed in the world coordinate system for alignment with the autonomous vehicle. The camera includes its own unique intrinsic and extrinsic parameters. The intrinsic parameters are internal and fixed to a particular camera and indicate the optical center and focal length of the particular camera. The extrinsic parameters define the location and orientation of the camera coordinate system with respect to the world coordinate system location and are used to transform readings expressed in the camera coordinate system into the world coordinate system.

The extrinsic parameters are estimated on-the-fly, which may create high computational loads that require significant system resources. In one approach to reduce computational load, the extrinsic parameters may be determined during offline manufacturing calibration that is performed at a final assembly plant. Although offline manufacturing calibration is accurate, this solution may not be used extensively since offline manufacturing calibration is expensive and may be inconvenient for users. Moreover, existing online calibration approaches for estimating camera extrinsic parameters may be duplicative and unnecessarily waste computational resources, since existing approaches use the same inertial and GPS sensor measurements to estimate vehicle poses as the localization module.

Thus, while current autonomous vehicle systems achieve their intended purpose, there is a need in the art for an improved approach for estimating camera extrinsic parameters.

SUMMARY

According to several aspects, a system for determining calibrated camera extrinsic parameters for an autonomous vehicle is disclosed. The system includes a camera mounted to the autonomous vehicle collecting image data including a plurality of image frames and one or more automated driving controllers in electronic communication with the camera. The one or more automated driving controllers execute instructions to determine a vehicle pose estimate based on position and movement of the autonomous vehicle by a localization algorithm. The one or more automated driving controllers execute instructions to determine a camera pose of the camera based on the vehicle pose estimate and initial camera extrinsic parameters. The one or more automated driving controllers execute instructions to identify specific feature points of interest between two sequential image frames that are part of the plurality of image frames. The one or more automated driving controllers execute instructions to execute a triangulation algorithm to determine three dimensional coordinates for the specific feature points of interests corresponding to the two sequential image frames. The one or more automated driving controllers execute instructions to execute a non-linear optimization algorithm to determine the calibrated camera extrinsic parameters based on the three dimensional coordinates for the specific feature points of interests corresponding to the two sequential image frames, the specific feature points of interests corresponding to the two sequential image frames, and the camera pose corresponding to the two sequential image frames.

In an aspect, identifying the specific feature points of interest between the two sequential image frames further comprises executing a feature detection algorithm to detect the specific feature points in the two sequential image frames, track feature points detected in an immediately preceding image frame with a current image frame, and select the specific feature points of interest between the two sequential image frames.

In another aspect, the one or more automated driving controllers execute instructions to determine a change in motion between the specific feature points of interest between the two sequential image frames.

In yet another aspect, the one or more automated driving controllers execute instructions to compare the change in motion between the specific feature points of interest between the two sequential image frames with a threshold amount of change in motion. The threshold amount of change in motion change in motion is a predefined tuning parameter that selects two image frames that are part of a sliding window. The one or more automated driving controllers execute instructions to determine the change in motion between the specific feature points of interest between the two sequential image frames is equal to or greater than the threshold amount of change in motion.

In an aspect, executing the non-linear optimization algorithm comprises minimizing reprojection error with respect to the calibrated camera extrinsic parameters and the three dimensional coordinates of the specific feature points of interests while solving a cost function.

In another aspect, the one or more automated driving controllers execute instructions to save results of solving the non-linear optimization algorithm to memory, clear a sliding window containing the sequential image frames, redetermine the calibrated camera extrinsic parameters, and after obtaining a threshold number of calibrated camera extrinsic parameters, perform one or more filtering and averaging operations.

In still another aspect, the camera pose is determined by transforming the initial camera extrinsic parameters from a vehicle body coordinate system to a world coordinate system.

In an aspect, the initial camera extrinsic parameters are saved in memory of the one or more automated driving controllers.

In another aspect, the initial camera extrinsic parameters represent an initial approximation of actual extrinsic parameters of the camera.

In still another aspect, the initial camera extrinsic parameters are expressed based on a vehicle body coordinate system and include an initial translation vector and an initial rotation matrix.

In an aspect, the specific feature points of interests corresponding to the two sequential image frames are expressed based on a two-dimensional image plane coordinate system.

In another aspect, the three dimensional coordinates of the specific feature points of interest are expressed based on a world coordinate system.

In still another aspect, the plurality of image frames are provided to the one or more automated driving controllers based on a sliding window buffer technique.

In an aspect, the vehicle pose estimate includes a vehicle translation vector and a vehicle rotation matrix that are both expressed based on a world coordinate system.

In one aspect, method for determining calibrated camera extrinsic parameters for an autonomous vehicle is disclosed. The method includes determining, by one or more automated driving controllers, a vehicle pose estimate based on position and movement of the autonomous vehicle by a localization algorithm. The method includes determining a camera pose of a camera mounted to the autonomous vehicle based on the vehicle pose estimate and initial camera extrinsic parameters, where the camera collects image data including a plurality of image frames. The method also includes identifying specific feature points of interest between two sequential image frames that are part of the plurality of image frames. The method further includes executing a triangulation algorithm to determine three dimensional coordinates for the specific feature points of interests corresponding to the two sequential image frames. Finally, the method includes executing a non-linear optimization algorithm to determine the calibrated camera extrinsic parameters based on the three dimensional coordinates for the specific feature points of interests corresponding to the two sequential image frames, the specific feature points of interests corresponding to the two sequential image frames, and the camera pose corresponding to the two sequential image frames.

In an aspect, the method includes executing a feature detection algorithm to detect the specific feature points in the two sequential image frames.

In another aspect, the method includes tracking the feature points detected in an immediately preceding image frame with a current image frame and selecting the specific feature points of interest between the two sequential image frames.

In still another aspect, the method includes determining a change in motion between the specific feature points of interest between the two sequential image frames.

In an aspect, the method includes comparing the change in motion between the specific feature points of interest between the two sequential image frames with a threshold amount of change in motion, wherein the threshold amount of change in motion is a predefined tuning parameter that selects two image frames that are part of a sliding window, and determining the change in motion between the specific feature points of interest between the two sequential image frames is equal to or greater than the threshold amount of change in motion.

In another executing the non-linear optimization algorithm comprises minimizing reprojection error with respect to the calibrated camera extrinsic parameters and the three dimensional coordinates of the specific feature points of interests while solving a cost function.

In still another embodiment, the method includes saving results of the non-linear optimization algorithm to memory, clearing a sliding window containing the sequential image frames, redetermining the calibrated camera extrinsic parameters, and after obtaining a threshold number of calibrated camera extrinsic parameters, performing one or more filtering and averaging operations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
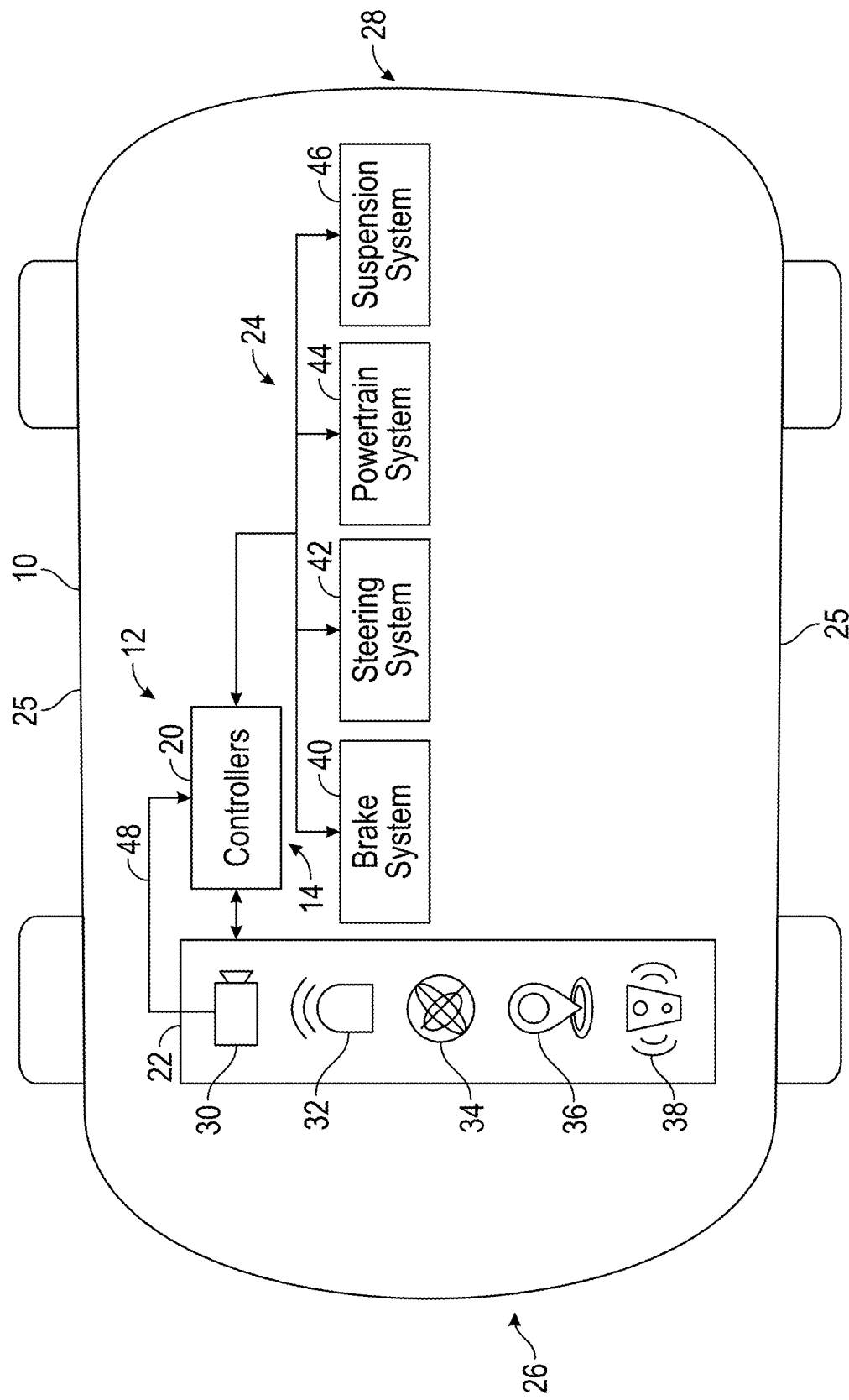
FIG. 1 is a schematic diagram of an exemplary autonomous vehicle including the disclosed system, where the system includes one or more automated driving controllers in electronic communication with a plurality of cameras, according to an exemplary embodiment.

Referring to FIG. 1, an exemplary autonomous vehicle 10 including a system 12 for calibrating camera extrinsic parameters is illustrated. The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) for performing all driving tasks. Alternatively, in another embodiment, the autonomous vehicle 10 is a semi-autonomous vehicle including an advanced driver assistance system (ADAS) for assisting a driver with steering, braking, and/or accelerating. The system 12 includes an autonomous driving system 14 having one or more automated driving controllers 20. The automated driving controllers 20 are in electronic communication with a plurality of autonomous sensors 22 and a plurality of vehicle systems 24. In the example as shown in FIG. 1, the plurality of autonomous sensors 22 include a plurality of cameras 30, radar 32, an inertial measurement unit (IMU) 34, a global positioning system (GPS) 36, and LiDAR 38, however, it is to be appreciated that additional sensors may be used as well. The plurality of cameras 30 are mounted on the sides 25, the front 26, and the rear 28 of the autonomous vehicle 10. The plurality of cameras 30 each capture image data 48 representative of the surrounding environment of the autonomous vehicle 10. The plurality of vehicle systems 24 include, but are not limited to, a brake system 40, a steering system 42, a powertrain system 44, and a suspension system 46.

Figure 2:
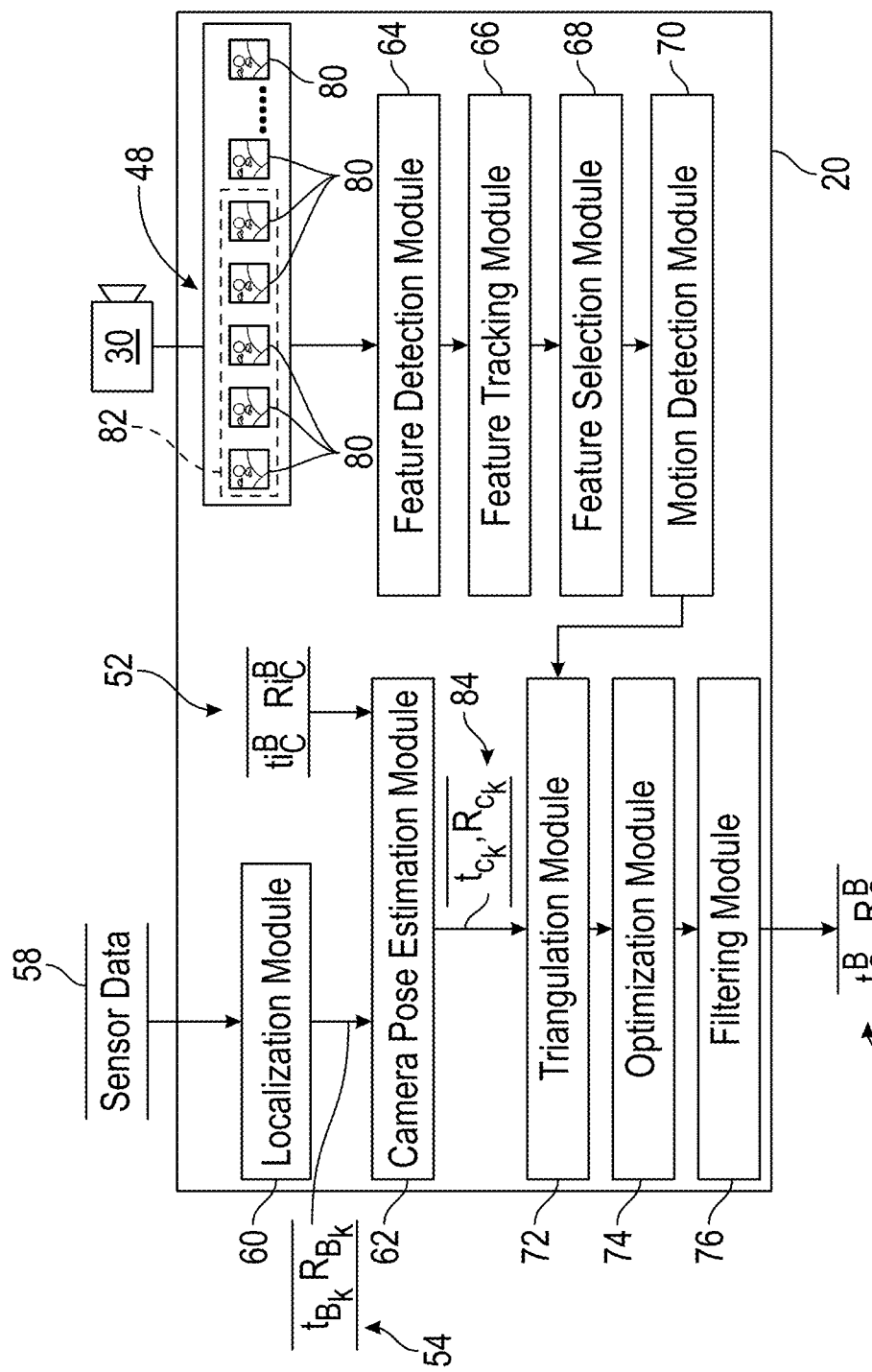
FIG. 2 is a block diagram of the automated driving controller that is shown in FIG. 1 for calibrating camera extrinsic parameters, according to an exemplary embodiment.

FIG. 2 is a block diagram of the one or more automated driving controllers 20. Referring to FIGS. 1 and 2, the one or more automated driving controllers 20 determine calibrated camera extrinsic parameters 50 associated with a specific camera 30 of the autonomous vehicle 10. The calibrated camera extrinsic parameters 50 transform readings expressed in the camera coordinate system of the specific camera 30 into the world coordinate system. Specifically, the calibrated camera extrinsic parameters 50 include a calibrated translation vector $t_C^B$ and a calibrated rotation matrix $R_C^B$ for transforming readings in the camera coordinate system into the world coordinate system. As explained below, the calibrated camera extrinsic parameters 50 are determined based on a vehicle pose estimate 54 determined by a localization algorithm executed by a localization module 60 that is part of the automated driving controller 20. The calibrated camera extrinsic parameters 50 are also determined based on initial camera extrinsic parameters 52 saved in memory of the one or more automated driving controllers 20, and by tracking feature points between two sequential image frames 80 collected by the specific camera 30. It is to be appreciated that the two sequential image frames 80 may or may not be non-consecutive with respect to one another. Instead, the image frames 80 are sequential as long as the images frames 80 are within the same sliding window 82. The sliding window 82 is described below, and is shown in FIG. 2 as containing five sequential image frames 80.

Referring to FIGS. 1 and 2, the one or more automated driving controllers 20 include the localization module 60, a camera pose estimation module 62, a feature detection module 64, a feature tracking module 66, a feature selection module 68, a motion detection module 70, a triangulation module 72, an optimization module 74, and a filtering module 76. The localization module 60 receives sensor data 58 from the plurality of autonomous sensors 22 (FIG. 1), where the sensor data 58 indicates a position and movement of the autonomous vehicle 10 for determining the vehicle pose estimate 54. The sensor data 58 may include, for example, angular rate and acceleration collected by the IMU 34, a location of the autonomous vehicle 10 collected by the GPS 36, and wheel speed collected by wheel speed sensors (not shown). The localization module 60 executes a localization algorithm to determine the vehicle pose estimate 54 based on the position and movement of the autonomous vehicle 10 indicated by the sensor data 58, where the vehicle pose estimate 54 includes a vehicle translation vector $t_{B_k}$ and a vehicle rotation matrix $R_{B_k}$ that are both expressed in the world coordinate system, where the variable k denotes a timestamp.

Continuing to refer to FIG. 2, the initial camera extrinsic parameters 52 are saved in memory of the one or more automated driving controllers 20. The initial camera extrinsic parameters 52 are expressed in the vehicle body coordinate system and include an initial translation vector $ti_C^B$ and an initial rotation matrix $Ri_C^B$. It is to be appreciated that the initial camera extrinsic parameters represent an initial approximation or an initial guess of the actual camera extrinsic parameters and are fixed in value, and therefore require further calibration before they may be used to transform readings expressed in the camera coordinate system of the specific camera 30 into the world coordinate system. The vehicle pose estimate 54 and initial extrinsic parameters 52 are sent to the camera pose estimation module 62.

The camera pose estimation module 62 determines a camera pose 84 of the specific camera 30 based on the vehicle pose estimate 54 determined by the localization module 60 and the initial camera extrinsic parameters 52. Specifically, the camera pose estimation module 62 transforms the initial camera extrinsic parameters 52, which are expressed in the vehicle body coordinate system, into the world coordinate system. The camera pose 84 is expressed in the world coordinate system in terms of a camera translation vector $t_{C_k}$ and a camera rotation matrix $R_{C_k}$ associated with the specific camera 30. Specifically, the camera translation vector $t_{C_k}$ is determined based on the vehicle rotation matrix $R_{B_k}$, the initial translation vector $ti_C^B$, and the vehicle translation vector $t_{B_k}$, and is expressed below in Equation 1. The camera rotation matrix $R_{C_k}$ is determined based on the vehicle rotation matrix $R_{B_k}$ and the initial rotation matrix $Ri_C^B$, and is expressed in Equation 2:

$$t_{C_k} = R_{B_k} ti_C^B + t_{B_k} \qquad \text{Equation 1}$$

$$R_{C_k} = R_{B_k} Ri_C^B \qquad \text{Equation 2}$$

Continuing to refer to FIG. 2, the feature detection module 64 receives the image data 48 from the specific camera 30, where the image data 48 includes a plurality of image frames 80 that are sequentially ordered by timestamp. Each image frame 80 is taken at a unique time and therefore each include unique timestamps. In an embodiment, the one or more automated driving controllers 20 receives the plurality of image frames 80 based on a sliding window buffer technique. The sliding window buffer technique involves containing a current number of sequentially ordered image frames 80 in the memory buffer at a single time, which is shown in FIG. 2 as a sliding window 82 drawn in phantom line. In the example as shown in FIG. 2, the sliding window 82 contains five image frames 80, where the sliding window 82 represents the memory buffer. However, it is to be appreciated that FIG. 2 is merely exemplary in nature and other numbers may be used as well. In an embodiment, no more than ten image frames 80 may be stored in the memory buffer at a time.

The feature detection module 64 executes a feature detection algorithm to detect feature points in the two sequential image frames 80, where the feature points detected are used as measurements to determine the calibrated camera extrinsic parameters 50. For example, the feature points may be keypoint features that are located in a specific location such as, for example, building corners, or the features point may be edges that represent the boundaries of an object. In embodiments, the feature detection module 64 detects a predefined number of feature points (e.g., 200 feature points) based on quality. The feature detection module 80 may also output a quality value along with each feature point detected. The feature tracking module 66 tracks the feature points detected in an immediately preceding image frame 80 with a current image frame 80. The feature selection module 68 selects specific feature points of interest between the two sequential image frames 80 and removes any feature points that are outliers or represent noise. In embodiments, the feature selection module 68 removes feature points representing the host vehicle, such as feature points representing the hood of the host vehicle, and then executes an outlier detection algorithm such as, for example, a random sample consensus (RANSAC) algorithm. Thus, the modules 64, 66, and 68 execute algorithms to identify specific feature points of interest between the two sequential image frames 80.

In an embodiment, the motion detection module 70 first determines a total number of the specific feature points of interest exist between the two sequential image frames 80 and compares the total number of specific feature points with a threshold value. The threshold value of specific feature points of interest indicate that a sufficient number of sample points exist to accurately determine movement between the two sequential image frames 80. For example, in an embodiment, the threshold number of specific feature points of interest is fifty.

The motion detection module 70 calculates a change in motion between the specific feature points of interest between the two sequential image frames 80 and compares the change in motion between the specific feature points of interest between the two sequential image frames 80 with a threshold amount of change in motion. The threshold amount of change in motion is a predefined tuning parameter that selects two image frames in the sliding window 82. It is to be appreciated that a greater amount of motion enables triangulating two-dimensional feature points to obtain three-dimensional points. If the motion detection module 70 determines the change in motion between the specific feature points of interest between the two sequential image frames 80 is equal to or greater than the threshold change in motion, then the motion detection module 70 determines the change in motion is sufficient, and the motion detection module 70 sends the specific feature points of interest to the triangulation module 72. However, if the motion detection module 70 determines the change in motion is not sufficient, then the feature detection module 64 evaluates the next sequential image frame 80.

The triangulation module 72 receives the specific feature points of interests corresponding to the two sequential image frames 80 from the motion detection module 70 as well as the camera poses 84 corresponding to the two sequential image frames 80 from the camera pose estimation module 62 and executes a triangulation algorithm to determine three dimensional coordinates for the specific feature points of interests corresponding to the two sequential image frames 80. It is to be appreciated that the specific feature points of interests corresponding to the two sequential image frames 80 are expressed in the two-dimensional image plane coordinate system, while the three-dimensional location of the specific feature points of interest are expressed in the world coordinate frame.

The optimization module 74 executes a non-linear optimization algorithm to determine the calibrated camera extrinsic parameters 50 associated with the specific camera 30 based on the three dimensional coordinates for the specific feature points of interests corresponding to the two sequential image frames 80, the specific feature points of interests corresponding to the two sequential image frames 80, and the camera poses 84 corresponding to the two sequential image frames 80. Specifically, the optimization module 74 executes the non-linear optimization algorithm to minimize the reprojection error with respect to the calibrated camera extrinsic parameters 50 and the three dimensional coordinates of the specific feature points of interests while solving a cost function. The results of the optimization are saved to memory, the sliding window 82 containing the sequential image frames 80 is cleared, and the one or more automated driving controllers 20 redetermines the calibrated camera extrinsic parameters 50 (i.e., the feature detection module 64 redetects the feature points in the two new sequential image frames 80). After obtaining a threshold number of calibrated camera extrinsic parameters 50 are determined, the filtering module 76 may perform one or more filtering and averaging operations to remove outliers and noise. In an embodiment, the threshold number of calibrated camera extrinsic parameters 50 is three hundred.

Figure 3:
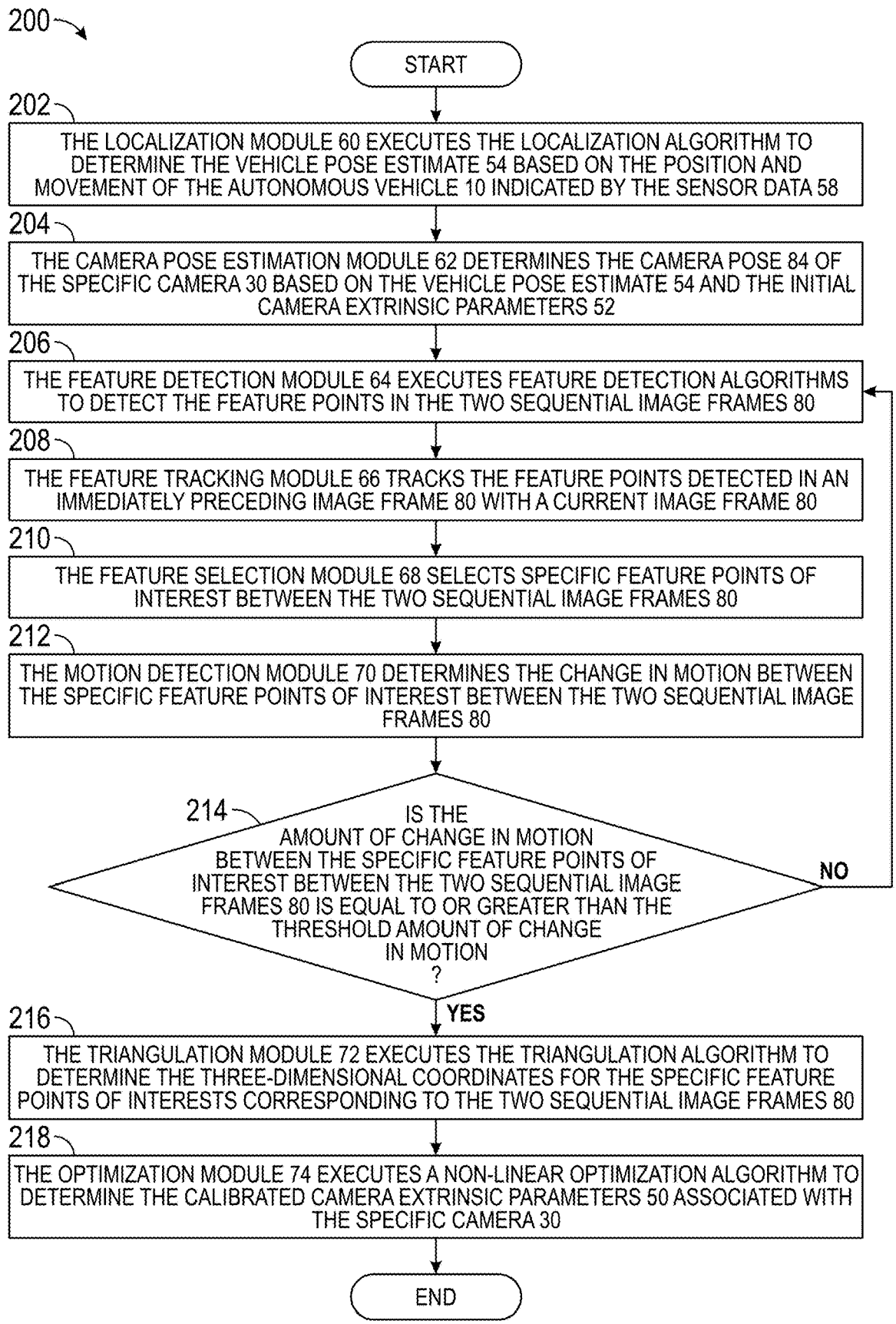
FIG. 3 is a process flow diagram illustrating an exemplary method for calibrating the camera extrinsic parameters, according to an exemplary embodiment.

FIG. 3 is a process flow diagram illustrating a method 200 for calibrating the initial camera extrinsic parameters 52. Referring generally to FIGS. 1-3, the method 200 may begin at block 202. In block 202, the localization module 60 executes the localization algorithm to determine the vehicle pose estimate 54 based on the position and movement of the autonomous vehicle 10 indicated by the sensor data 58. The method 200 may then proceed to block 204.

In block 204, the camera pose estimation module 62 determines the camera pose 84 of the specific camera 30 based on the vehicle pose estimate 54 and the initial camera extrinsic parameters 52. The method 200 may then proceed to block 206.

In block 206, the feature detection module 64 executes feature detection algorithms to detect the feature points in the two sequential image frames 80. The method 200 may then proceed to block 208.

In block 208, the feature tracking module 66 tracks the feature points detected in an immediately preceding image frame 80 with a current image frame 80. The method 200 may then proceed to block 210.

In block 210, the feature selection module 68 selects specific feature points of interest between the two sequential image frames 80. The method 200 may then proceed to block 212.

In block 212, the motion detection module 70 determines the change in motion between the specific feature points of interest between the two sequential image frames 80 and compares the change in motion between the specific feature points of interest between the two sequential image frames 80 with the threshold amount of change in motion. The method 200 may then proceed to decision block 214.

In block 214, if the motion detection module 70 determines the amount of change in motion between the specific feature points of interest between the two sequential image frames 80 is equal to or greater than the threshold amount of change in motion, then the method 200 may proceed to block 216. Otherwise, the method 200 may return to block 206.

In block 216, the triangulation module 72 executes the triangulation algorithm to determine the three-dimensional coordinates for the specific feature points of interests corresponding to the two sequential image frames 80. The method 200 may then proceed to block 218.

In block 218, the optimization module 74 executes a non-linear optimization algorithm to determine the calibrated camera extrinsic parameters 50 associated with the specific camera 30 based on the three-dimensional coordinates for the specific feature points of interests corresponding to the two sequential image frames 80, the specific feature points of interests corresponding to the two sequential image frames, and the camera poses 84 corresponding to the two sequential image frames 80. The method 200 may then terminate or return to block 202.

Referring generally to the figures, the disclosed system provides various technical effects and benefits by calibrating camera extrinsic parameters. Specifically, the disclosed system only requires tracking feature points from two images frames and re-uses the vehicle pose information from the localization module rather than re-estimating the vehicle pose, and therefore does not require duplicative efforts to determine the vehicle pose. Thus, the disclosed system results in reduced computational complexity when compared to current state-of-the-art methods, and in embodiments may execute orders of magnitude faster when compared to current approaches.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining calibrated camera extrinsic parameters for an autonomous vehicle, the system comprising:
    a camera mounted to the autonomous vehicle collecting image data including a plurality of image frames;
    one or more automated driving controllers in electronic communication with the camera that executes instructions to:
        determine a vehicle pose estimate based on position and movement of the autonomous vehicle by a localization algorithm;
        determine a camera pose of the camera based on the vehicle pose estimate and initial camera extrinsic parameters;
        identify specific feature points of interest between two sequential image frames that are part of the plurality of image frames;
        execute a triangulation algorithm to determine three dimensional coordinates for the specific feature points of interests corresponding to the two sequential image frames; and
        execute a non-linear optimization algorithm to determine the calibrated camera extrinsic parameters based on the three dimensional coordinates for the specific feature points of interests corresponding to the two sequential image frames, the specific feature points of interests corresponding to the two sequential image frames, and the camera pose corresponding to the two sequential image frames.

2. The system of claim 1, wherein identifying the specific feature points of interest between the two sequential image frames further comprises:
    execute a feature detection algorithm to detect the specific feature points in the two sequential image frames;
    track feature points detected in an immediately preceding image frame with a current image frame; and
    select the specific feature points of interest between the two sequential image frames.

3. The system of claim 1, wherein the one or more automated driving controllers execute instructions to:
    determine a change in motion between the specific feature points of interest between the two sequential image frames.

4. The system of claim 3, wherein the one or more automated driving controllers execute instructions to:
    compare the change in motion between the specific feature points of interest between the two sequential image frames with a threshold amount of change in motion, wherein the threshold amount of change in motion change in motion is a predefined tuning parameter that selects two image frames that are part of a sliding window; and
    determine the change in motion between the specific feature points of interest between the two sequential image frames is equal to or greater than the threshold amount of change in motion.

5. The system of claim 1, wherein executing the non-linear optimization algorithm comprises:
    minimize reprojection error with respect to the calibrated camera extrinsic parameters and the three dimensional coordinates of the specific feature points of interests while solving a cost function.

6. The system of claim 5, wherein the one or more automated driving controllers execute instructions to:
    save results of solving the non-linear optimization algorithm to memory;
    clear a sliding window containing the sequential image frames;
    redetermine the calibrated camera extrinsic parameters; and
    after obtaining a threshold number of calibrated camera extrinsic parameters, perform one or more filtering and averaging operations.

7. The system of claim 1, wherein the camera pose is determined by transforming the initial camera extrinsic parameters from a vehicle body coordinate system to a world coordinate system.

8. The system of claim 1, wherein the initial camera extrinsic parameters are saved in memory of the one or more automated driving controllers.

9. The system of claim 1, wherein the initial camera extrinsic parameters represent an initial approximation of actual extrinsic parameters of the camera.

10. The system of claim 1, wherein the initial camera extrinsic parameters are expressed based on a vehicle body coordinate system and include an initial translation vector and an initial rotation matrix.

11. The system of claim 1, wherein the specific feature points of interests corresponding to the two sequential image frames are expressed based on a two-dimensional image plane coordinate system.

12. The system of claim 1, wherein the three dimensional coordinates of the specific feature points of interest are expressed based on a world coordinate system.

13. The system of claim 1, wherein the plurality of image frames are provided to the one or more automated driving controllers based on a sliding window buffer technique.

14. The system of claim 1, wherein the vehicle pose estimate includes a vehicle translation vector and a vehicle rotation matrix that are both expressed based on a world coordinate system.

15. A method for determining calibrated camera extrinsic parameters for an autonomous vehicle, the method comprising:
    determining, by one or more automated driving controllers, a vehicle pose estimate based on position and movement of the autonomous vehicle by a localization algorithm;
    determining a camera pose of a camera mounted to the autonomous vehicle based on the vehicle pose estimate and initial camera extrinsic parameters, wherein the camera collects image data including a plurality of image frames;
    identifying specific feature points of interest between two sequential image frames that are part of the plurality of image frames;

executing a triangulation algorithm to determine three dimensional coordinates for the specific feature points of interests corresponding to the two sequential image frames; and executing a non-linear optimization algorithm to determine the calibrated camera extrinsic parameters based on the three dimensional coordinates for the specific feature points of interests corresponding to the two sequential image frames, the specific feature points of interests corresponding to the two sequential image frames, and the camera pose corresponding to the two sequential image frames.

16. The method of claim 15, further comprising:

executing a feature detection algorithm to detect the specific feature points in the two sequential image frames;

tracking the feature points detected in an immediately preceding image frame with a current image frame; and selecting the specific feature points of interest between the two sequential image frames.

17. The method of claim 15, further comprising:

determining a change in motion between the specific feature points of interest between the two sequential image frames.

18. The method of claim 17, further comprising:

comparing the change in motion between the specific feature points of interest between the two sequential image frames with a threshold amount of change in motion, wherein the threshold amount of change in motion is a predefined tuning parameter that selects two image frames that are part of a sliding window; and determining the change in motion between the specific feature points of interest between the two sequential image frames is equal to or greater than the threshold amount of change in motion.

19. The method of claim 18, wherein executing the non-linear optimization algorithm comprises:

minimizing reprojection error with respect to the calibrated camera extrinsic parameters and the three dimensional coordinates of the specific feature points of interests while solving a cost function.

20. The method of claim 19, further comprising:

saving results of the non-linear optimization algorithm to memory;

clearing a sliding window containing the sequential image frames;

redetermine the calibrated camera extrinsic parameters; and after obtaining a threshold number of calibrated camera extrinsic parameters, performing one or more filtering and averaging operations.

* * * * *